US 9,684,284 B2

(12) United States Patent
Zhu

(10) Patent No.: US 9,684,284 B2
(45) Date of Patent: Jun. 20, 2017

(54) SETTING AN ALARM CLOCK ON A SMART DEVICE

(71) Applicant: Alibaba Group Holding Limited, George Town (KY)

(72) Inventor: Yimeng Zhu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/077,771

(22) Filed: Mar. 22, 2016

(65) Prior Publication Data

US 2016/0282816 A1    Sep. 29, 2016

(30) Foreign Application Priority Data

Mar. 27, 2015   (CN) .......................... 2015 1 0142467

(51) Int. Cl.
G04G 5/04      (2006.01)
G04G 13/02     (2006.01)
G04G 21/08     (2010.01)
G06F 3/0488    (2013.01)

(52) U.S. Cl.
CPC ............. *G04G 13/021* (2013.01); *G04G 5/04* (2013.01); *G04G 13/02* (2013.01); *G04G 21/08* (2013.01); *G06F 3/0488* (2013.01)

(58) Field of Classification Search
CPC .......... G04G 5/04; G04G 5/043; G04G 13/02; G04G 13/021; G04G 21/08; G06F 3/0488
See application file for complete search history.

(56) References Cited

U.S. PATENT DOCUMENTS

| | | |
|---|---|---|
| 5,805,530 A | 9/1998 | Youngberg |
| 5,995,455 A | 11/1999 | Kutosky |
| 6,477,117 B1 | 11/2002 | Narayanaswami et al. |
| 7,656,275 B2 | 2/2010 | Marui |
| 8,063,751 B2 | 11/2011 | Marui |
| 8,787,984 B2 * | 7/2014 | Murakami ............ G06F 3/0488 455/411 |
| 9,323,450 B2 * | 4/2016 | Zhang .................. G06F 3/0484 |
| 2005/0099893 A1 | 5/2005 | Jyrinki |
| 2005/0249023 A1 | 11/2005 | Bodlaender |
| 2007/0018957 A1 | 1/2007 | Seo |
| 2007/0072629 A1 | 3/2007 | Bae |
| 2007/0171192 A1 | 7/2007 | Seo et al. |
| 2008/0165149 A1 | 7/2008 | Platzer et al. |
| 2008/0186808 A1 | 8/2008 | Lee |
| 2008/0259742 A1 | 10/2008 | Tadanori |
| 2010/0058252 A1 | 3/2010 | Ko |
| 2010/0146384 A1 | 6/2010 | Peev et al. |
| 2010/0306705 A1 * | 12/2010 | Nilsson ................ G06F 3/0488 715/835 |
| 2011/0037594 A1 | 2/2011 | Ou Yang et al. |
| 2012/0108166 A1 * | 5/2012 | Hymel .................... H04M 1/67 455/26.1 |
| 2012/0165071 A1 | 6/2012 | Hsu et al. |
| 2013/0033436 A1 | 2/2013 | Brinda et al. |
| 2014/0137048 A1 | 5/2014 | Vander Veen et al. |
| 2016/0088148 A1 * | 3/2016 | Kim ...................... G06F 1/1643 455/418 |

* cited by examiner

*Primary Examiner* — Vit W Miska

(74) *Attorney, Agent, or Firm* — Van Pelt, Yi & James LLP

(57) ABSTRACT

Embodiments of the present application relate to a method and apparatus for setting an alarm clock. The method includes receiving an input directed at a time-display area on a display screen of a device, adjusting time information displayed on the display screen according to the input, and setting an alarm clock according to the adjusted time information.

37 Claims, 7 Drawing Sheets

SETTING AN ALARM CLOCK ON A SMART DEVICE

CROSS REFERENCE TO OTHER APPLICATIONS

This application claims priority to People's Republic of China Patent Application No. 201510142467.4 entitled A METHOD, A MEANS, AND AN ELECTRONIC DEVICE FOR SETTING AN ALARM CLOCK OF A SMART DEVICE, filed Mar. 27, 2015 which is incorporated herein by reference for all purposes.

FIELD OF THE INVENTION

The present application relates to the field of electronic devices and, in particular, smart device technology. In particular, the present application relates to a method, system, and device for setting an alarm clock on a smart device and an alarm clock setting unit for a smart device.

BACKGROUND OF THE INVENTION

With the popularization of smart devices, more and more users are making use of alarm clock applications ("apps") on smart devices to perform functions such as reminder functions. The alarm clock app has become a widely used function on smart devices. However, according to the related art, alarm clock apps generally involve relatively complex operations in connection with the setting of various functions provided by such apps. For example, according to some related art, the method for setting an alarm clock app includes opening a settings application, selecting 'Set Alarm,' or finding and activating the alarm clock app program, then in a time-setting interface, using either screen-touch operations or keyboard input to enter time information and to set the alarm clock corresponding to such time information; and when the alarm clock is set, implementing the reminder function through ringing or in another manner.

Thus, it is clear that the process of setting an alarm using the setting scheme of existing alarm clock apps is relatively tedious. The operations of such alarm clock apps are inconvenient for users, and the scheme for setting the alarm clock is inefficient. As an example, if a smart device on which an alarm clock app is to be set is in a screen-locked state, the user is required first to execute an unlocking operation. Accordingly, the entire operating process is made even more tedious if a smart device needs to be unlocked according to an unlocking operation before an alarm clock function can be set in the alarm clock app. In addition, in the case of a temporary alarm clock that requires setting a reminder after a few minutes, a user is further required to spend time and attention in setting whether such an alarm clock needs to be repeated. User experience is adversely affected as a result.

BRIEF DESCRIPTION OF THE DRAWINGS

Various embodiments of the invention are disclosed in the following detailed description and the accompanying drawings.

DETAILED DESCRIPTION

Figure 1:
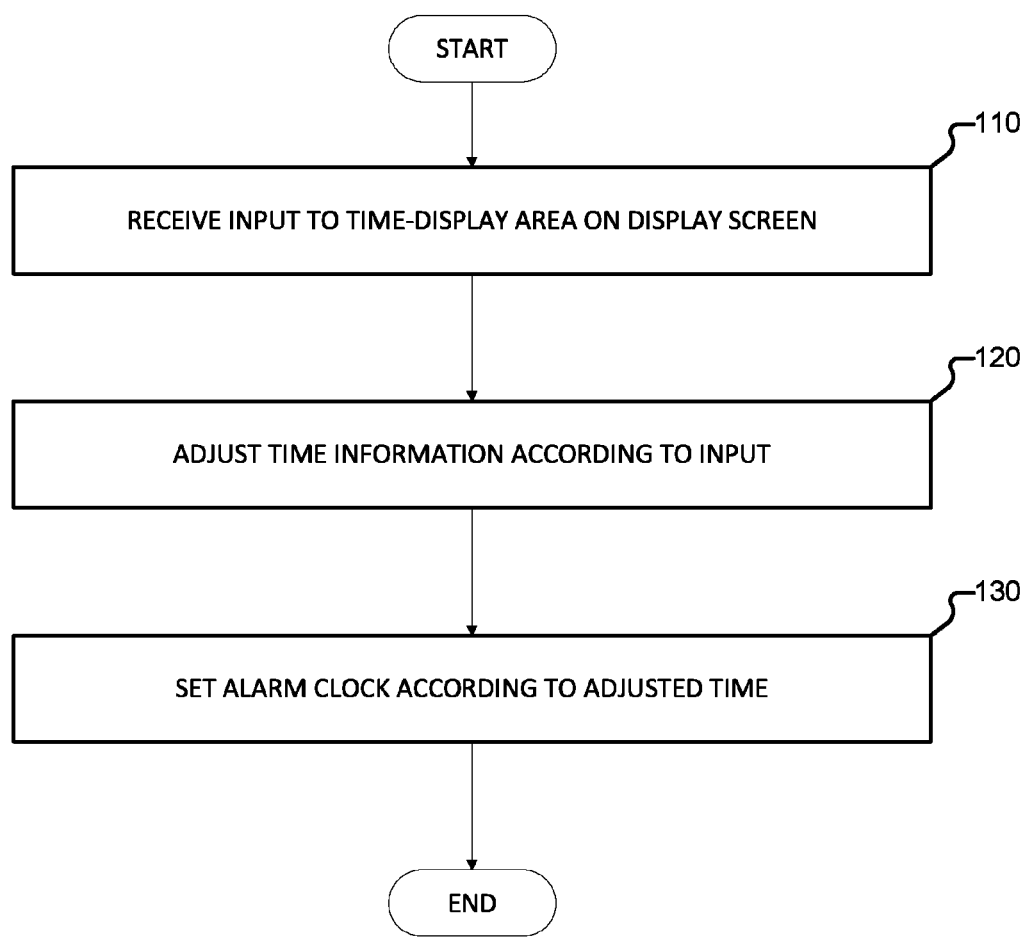
FIG. 1 is a flowchart of a method for setting an alarm clock on a device according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to various embodiments of the present disclosure, an alarm clock can be configured. An alarm clock application can be configured from a screen that is displayed on a graphical user interface and that is displayed when a smart device is in a locked state. Various embodiments include a method for setting an alarm clock on a smart device or an alarm clock setting unit for a smart device. Embodiments of the present application also provide an electronic device.

Setting the time in conventional alarm clock apps generally requires a user to open the settings app and select the alarm clock setting, or to find and activate an alarm clock app and then enter time information via a time-setting interface and set the alarm clock corresponding to the time information. The time information can be entered using screen-touch operations, keyboard input, or some other such method. It is thus clear that, in conventional schemes for setting alarm clock apps, the process of setting the alarm clock is relatively cumbersome, and the operations required to set the alarm clock are rather complex. The setting of the time in a conventional alarm clock app is further complicated if the smart device is in a screen-locked state. For example, in order to set a conventional alarm clock, if the smart device is in a screen-locked state, the user is required to execute an unlock operation before opening the settings app and selecting the alarm clock setting, or before finding and activating the alarm clock app and entering time information via a time-setting interface.

According to various embodiments, time information displayed on the display screen can be adjusted in response to receiving a touch-control operation (e.g., a swiping operation or a dragging operation via an external input device) directed at a time-display area on the screen. In other words, the touch-control operation is detected by the operating system, and the location of the initial touch-control operation is within the time-display area for the time numerals. Adjusted time information can be input to the device in connection with the touch-control operation directed at the time-display area on the screen. In response to the device receiving the adjusted time information, the alarm clock is set according to the adjusted time information. Accordingly, the alarm clock of a device (e.g., the alarm clock of an alarm clock app or the like executing on a device such as a mobile phone, a wearable device, or other personal computing devices) can be rapidly set based on an input being directed to the time-display area on the screen. Further, the alarm clock of the device can be rapidly set even in the event that the device is in a screen-locked state. In some embodiments, the touch-control operation can be input via a touchscreen of the device.

Setting an alarm clock can be implemented in various types of devices such as smart devices. A smart device can be an electronic device that operates an operating system and/or that is connected to another electronic device over a communication protocol such as Bluetooth, Near Field Communication (NFC), WiFi, 3G, or the like. As an example, a smart device can include a smart phone that runs iOS® or Android®. A smart device can be a wearable electronic device such as a watch, a health monitor, or the like. However, various embodiments are not limited to smart device-based applications. Various embodiments can be implemented in various electronic devices such as electronic devices that can display time on a display screen, that have an alarm clock reminder function, and that can receive screen touch-control operations.

Setting an alarm clock includes receiving a touch-control operation directed at a time-display area on a display screen, adjusting time information displayed on the display screen according to the touch-control operation, and setting an alarm clock according to the adjusted time information. In some embodiments, adjusting time information can include adjusting the time information on the alarm clock setting interface, or directly adjusting the time information in the time-display area. In some embodiments, the time-display area corresponds to an area within which time information (e.g., a current time) is displayed. The time-display area can have predefined dimensions. In some embodiments, characteristics (e.g., size, location, or the like) of the time-display area are configurable such as by a user.

In the event that adjusting the time information includes adjusting the time information on the alarm clock setting interface, a settings app of the smart device or the alarm clock setting function in the alarm clock app (e.g., sometimes referred to as the clock app for smart devices) can be used to adjust the time information. For example, in response to receiving a touch-control operation (e.g., a touch input) directed at the time-display area on the display screen, the alarm clock setting interface can be invoked and displayed in the settings app or the alarm clock app. The alarm clock setting interface can be used to adjust the time information according to the received touch-control operation. In response to receiving a touch-control operation that indicates that the setting of the time information is complete (e.g., a click on the "OK" button in the alarm clock setting interface), the alarm clock is set according to the adjusted time information. The settings app of the smart device can correspond to a native settings function or application that can be used to set an alarm clock. The settings app can correspond to a system-level function that is embedded in the smart phone (e.g., in the operating system running on the smart device). In some embodiments, the settings app is a third party app that is purchased from an app store and installed on the smart device.

For example, in response to receiving an indication that the setting of the time information has occurred, the adjusted time information is stored on a memory associated with the device and an alarm clock function uses the adjusted time information in connection with operating the alarm clock of the device.

Various embodiments include a method for setting an alarm clock for a smart device. In some embodiments, time information is adjusted in the time-display area. In some embodiments, the time information adjusted based on input to (or within a predefined threshold distance of) the time-display area corresponds to time information used in connection with an alarm clock app. For example, the alarm clock app can use the time information when operating an alarm clock. The adjustment of time information based on an input to the time-display area allows for a rapid setting of an alarm clock.

The smart device can correspond to a device that has a touchscreen. In some embodiments, the smart device does not have a touchscreen. In some embodiments, the device can display, in the time-display area of the display screen, time in a digital manner (e.g., "hours: minutes" form), or in an analog manner (e.g., a dial form).

FIG. 1 is a flowchart of a method for setting an alarm clock on a device according to various embodiments of the present disclosure.

Referring to FIG. 1, process 100 for setting an alarm clock on a device is provided. Process 100 can be implemented by, for example, alarm clock setting unit 500 of FIG. 5, device 600 of FIG. 6, or computer system 700 of FIG. 7.

At 110, an input is received to a time-display area on a display screen. The input can be a touch input to a touchscreen. One example is a touch-control operation directed at the time-display area on the display screen. In some embodiments, an input within a predefined distance of the time-display area on the display can be deemed an input to the time-display area.

In some embodiments, the time-display area comprises a time-display area on a lock screen interface, a time-display area on a desktop, or a time-display area on a status bar.

The device can be a smart device that has an input interface such as a touchscreen. The device can display time digitally in the time-display area. The time-display area can display time information in real time. For example, a time that is displayed in the display area is updated in real time according to the current system time (e.g., the time determined by the device).

In some embodiments, the alarm clock time can be set by a user by an input such as a touch input of swiping a finger across the time numerals displayed in the time-display area. In some embodiments, in the event an input is made to the time-numerals displayed in the time-display area (e.g., via a touch input), real-time display of current time in the time-display area is temporarily suspended. The real-time display can be suspended for a threshold amount of time. The threshold amount of time can be configurable according to user preferences, device settings, or the like. In some embodiments, the input to the time-numerals displayed in the time-display area (e.g., that causes the device to suspend the real-time display) can correspond to a swiping operation directed at a time numeral in the time-display area. The swiping operation can include an upward swipe or a downward swipe. For example, in response to receiving an upward swipe touch input to the time-display area, the real-time display in the time-display area is suspended.

Time information can be displayed in the time-display area. For example, the time information can include time numerals.

The time numerals can include a numeral that represents hours (also referred to as the hour numeral) and a numeral that represents minutes (also referred to as the minute numeral). In some embodiments, the input to the time-display area in response to which the real-time display is suspended corresponds to a touch input (e.g., a touch input corresponding to a swiping operation to one or more of the hour numeral or the minute numeral). For example, the sliding operation can be directed at the hour numeral or directed at the minute numeral.

Figure 2:
FIG. 2 is an illustration of a user swiping operation directed at a time-display area on a display screen according to various embodiments of the present disclosure.

FIG. 2 is an illustration of a user swiping operation directed at a time-display area on a display screen according to various embodiments of the present disclosure.

Referring to FIG. 2, illustration of a user swiping operation 230 directed at a time-display area 210 on a display screen 200 is provided. The user swiping operation 230 to the input to the time-display area 210 can correspond to the input received at 110 of process 100 of FIG. 1.

Figure 3:
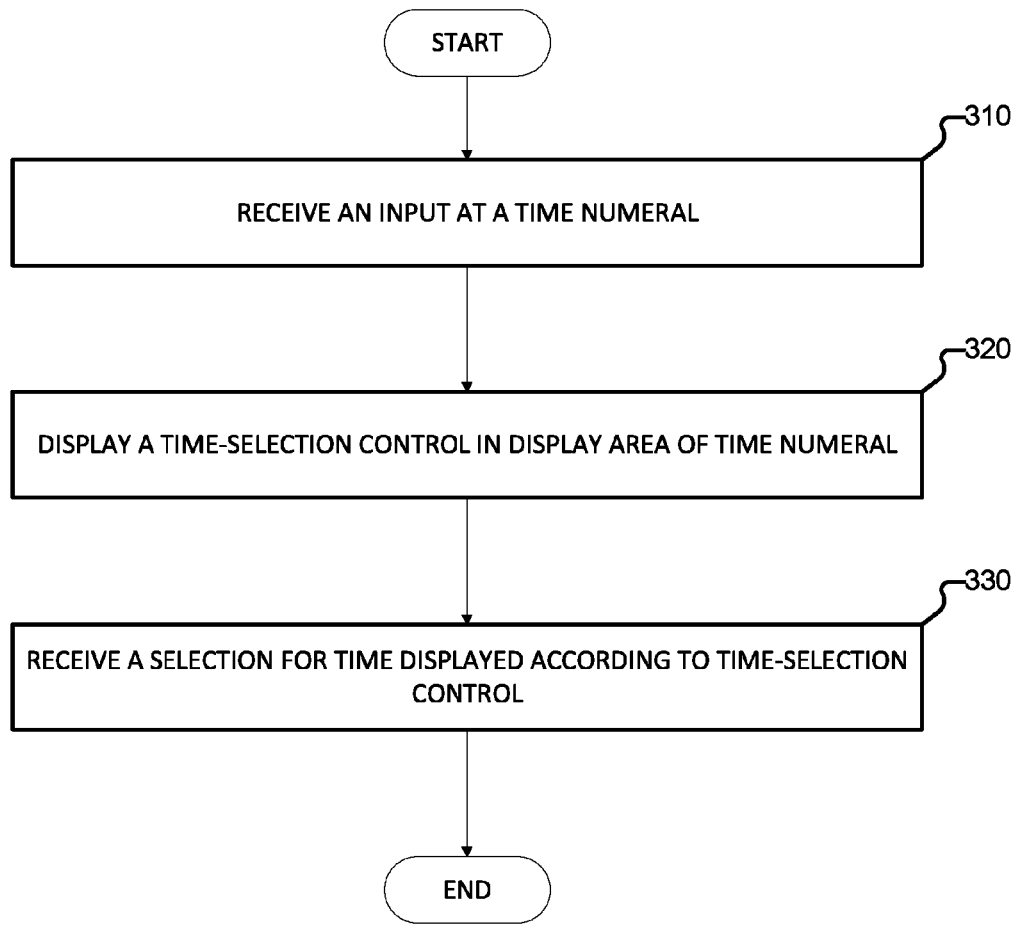
FIG. 3 is a flowchart of a method for receiving a touch-control operation directed at a time-display area on a display screen according to various embodiments of the present disclosure.

FIG. 3 is a flowchart of a method for receiving a touch-control operation directed at a time-display area on a display screen according to various embodiments of the present disclosure.

Referring to FIG. 3, process 300 for receiving a touch-control operation directed at a time-display area on a display screen is provided. Process 300 can be implemented in connection with 110 of process 100 of FIG. 1. Process 300 can be implemented by, for example, alarm clock setting unit 500 of FIG. 5, device 600 of FIG. 6, or computer system 700 of FIG. 7.

At 310, an input is received at a time numeral. In some embodiments, the input is an initial touch-control operation directed at the time numeral displayed in the time-display area on the display screen. The input can be detected via the operating system running on the device, or the like.

According to various embodiments, in connection with setting the alarm clock (e.g., the alarm clock time), the user can execute multiple touch-control operations directed at the hour numeral or the minute numeral in the time-display area. The initial touch-control operation can be a preset touch-control operation, such as a single-click, a double-click, a swipe operation, or the like.

At 320, a time selection control is displayed. The time-selection control can be displayed in the display area corresponding to the time numerals. In some embodiments, the time-selection control can be determined based at least in part on the initial touch-control operation (e.g., the type of initial touch-control operation, or the like).

In some embodiments, if the touch-control operation (e.g., the initial touch-control operation) is directed at the hour numeral, then a time-selection control with a value range of 0 to 23 is displayed in the display area corresponding to the hour numeral. In some embodiments, if the touch-control operation (e.g., the initial touch-control operation) is directed at the minute numeral, then a time-selection control with a value range of 0 to 59 is displayed in the display area corresponding to the minute numeral.

The time-selection control can include multiple forms such as a drop-down list, a table, a text box, or the like. In some embodiments, the time-selection control includes a wheel control. The wheel control is generally considered a relatively more user-friendly graphic interface. For example, in response to receiving the initial operation directed at the time numeral, a wheel control having the appropriate value range (e.g., 1-12 or 0-23 can be displayed for setting of the hour numeral, or 0-59 can be displayed for setting the minute numeral) is displayed in the display area corresponding to the time numeral.

At 330, a selection input according to the time-selection control is received. The selection input can correspond to a selection for time. For example, a selection operation for the time numeral displayed by the time-selection control is received. In the event that the time-selection control includes a text box, the selection operation can correspond to an input of text (e.g., numbers) corresponding to the desired time.

The appropriate time-selection control is displayed according to the received touch-control operation directed at the hour numeral or the minute numeral. In some embodiments, the time-selection control can be displayed in connection with 320. For example, the displaying of the time-selection control can include a determining of the time-selection control to be displayed based at least in part on the received touch-control operation directed at the time-display area. In some embodiments, the selection input of 330 can be received in connection with 320. For example, 320 and 330 can be performed according to one step.

In the event that the displayed time-selection control is a pull-down list or a table, then the selection operation can include a touch-control operation (e.g., a single-click operation, a press-and-hold operation, or the like) directed at a specific time numeral displayed in the list or table. For example, a user can touch the touchscreen at a location corresponding to the display of the specific time numeral in the list or the table.

In the event that the time-selection control includes a wheel control, the time-selection control can be an input to change (e.g., turn) the wheel of the wheel control. For example, if the time-selection control includes a wheel control, then the selection input is received based on a swiping (also referred to as "dialing") operation directed (e.g., by the user) at the wheel. In response to receiving an upward swiping operation directed at the wheel control, the time-selection control will, in connection with rotating the wheel on the display screen, automatically increase the corresponding time numeral displayed (e.g., in the center of the wheel control) in accordance with the value range for the time numeral. Conversely, in response to receiving a downward swiping operation directed at the wheel control, the time-selection control will, in connection with rotating the wheel on the display screen, automatically decrease the time numeral displayed (e.g., in the center of the wheel control)

in accordance with the value range for the time numeral. The time numeral can be configured according to one or more characteristics of an input (e.g., the swiping operation directed at the wheel). For example, the one more characteristics can include a direction of the input, a speed, a length, or the like. In some embodiments, the time numeral displayed will be changed based at least in part on the swiping operation directed at the wheel. In some embodiments, the time numeral can be changed based at least in part on the length of the swiping operation. A longer swiping operation can correspond to a relatively greater change in the corresponding time numeral, and a shorter swiping operation can correspond to a relatively smaller change in the corresponding time numeral. In some embodiments, the time numeral can be changed based at least in part on a speed of the swiping operation.

In some embodiments, an interface provided by the device (e.g., provided by the operating system or other program running on the system) is used to implement the wheel function. For example, in the case of smart devices that run an iOS® system, a UIDatePicker controller class provided by the iOS® system can be used to implement the wheel operation described above.

Process 300 of FIG. 3 is an implementation of various embodiments for a time-selection control. Various other embodiments adopt other processes for receiving input in connection with time-selection control. For example, various embodiments display text-input boxes for a time-selection control. According to various embodiments, in response to the received initial touch-control operation directed at the time-display area, a text-input box is displayed in the time-display area of the display screen. In addition, a virtual keyboard can be displayed on the display screen. The virtual keyboard can be displayed on the display screen contemporaneously with the text-input box. The virtual keyboard can be used to receive an input for the text-input box. For example, touch-control operations by the user directed at the virtual keyboard can be received. Accordingly, the time information in the time-display area is adjusted according to the received input information. For example, at 120 of process 100 of FIG. 1, the time information in the time-display area is adjusted in response to the received input to the virtual keyboard displayed in connection with the text-input box for time-selection control.

In some embodiments, after the touch-control operation directed at the time-display area is received, the time-display area is enlarged according to preset dimensions. Enlargement of the time-display area can facilitate user execution of touch-control operations directed at the time-display area. After completion of the subsequent alarm-setting operation (e.g., after the user has input a selection input such as for time), the size of the time-display area can be further restored to the original size displayed on the status bar. For example, the time-display area displayed on a typical status bar is relatively small, with limited operational space. After the time-display area on the status bar undergoes enlargement processing, the enlarged time-display area lends greater convenience to user operations.

Returning to FIG. 1, at 120, time information is adjusted according to the input to the time-display area. In some embodiments, the time information in the time-display area is adjusted based at least in part on the input to the time-display area on the display screen. For example, the time information in the time-display area is adjusted based at least in part on the touch-control operation.

In some embodiments, the time selection control is not displayed. In response to receiving an input (e.g., a swipe operation) directed at the time numeral in the time-display area, the time information in the time-display area is adjusted based on the input. If the input is a swiping operation corresponding to an upward swipe (e.g., a touch input in which the touch is maintained while dragged upwards), the time numeral displayed in the time-display area is increased in accordance with the value range of the time numeral. The extent of the increase in the time numeral can depend on one or more characteristics of the upward swipe such as a speed, a distance, or the like. If the input is a swiping operation corresponding to a downward swipe (e.g., a touch input in which the touch is maintained while dragged downwards), the time numeral displayed in the time-display area is decreased in accordance with the value range of the time numeral. The extent of the decrease in the time numeral can depend on one or more characteristics of the downward swipe such as a speed, a distance, or the like.

For example, if the time numerals in the time-display area are "13:28" and an upward swiping operation directed at the time numeral "28" (e.g., the minutes numeral) is received, then in response to receiving an upward swiping operation directed at the minute numeral "28," the time numeral displayed in the time-display area can be increased according to the magnitude of the upward swipe (e.g., the minute numeral "28" is adjusted to "30"). In response to the swiping operation directed at the time numeral such that the minute numeral "28" is adjusted to "30," an alarm is set to go off in two minutes (e.g., at 13:30).

According to various embodiments, the time-selection control is displayed according to the received touch-control operation. The time information in the time-display area can be adjusted according to the selection operation. For example, the time information can be adjusted based at least in part on a user's input.

If the time-selection control displayed is a pull-down list or a table, then the number selected in the list or table is to update the corresponding time numeral in the time-display area. In response to receiving selection of a number in the list or table from the user, the time numeral in the time-display area can be updated.

If the time-selection control displayed is a wheel control, then the time numeral can be updated according to a selection selected via the wheel control. For example, in response to rotation of the wheel control stopping, the number displayed in the center of the wheel is deemed the selected number. A user can control selection of the selected number by controlling rotation of the wheel (e.g., via a touch input to the touchscreen or the like). The selected number can be used to update the corresponding time numeral in the time-display area.

According to various embodiments, one or more inputs to the time-display area are on the display screen and the adjustment of time information based on the one or more inputs can be repeatedly executed many times. For example, the time information displayed in the time-display area can be repeatedly adjusted according to the touch-control operations (e.g., touch-control operations input by the user). The time displayed in the time-display area is adjusted to the time at which the user sets the alarm clock.

At 130, an alarm clock is set. The alarm clock can be set according to the adjusted time information. Setting of the alarm clock can include storing the adjusted time information such that the time information is associated with an alarm clock function (e.g., of an alarm clock app). Accordingly, the alarm clock app can use the adjusted time information in connection with controlling the alarm clock. The setting of the alarm clock according to the adjusted time information can include updating existing time information associated with the alarm clock with the adjusted time information.

In some embodiments, the alarm clock is set according to the time information displayed in the time-display area in response to the time information being adjusted according to the input.

In some embodiments, the setting of the alarm clock according to the adjusted time includes receiving an input confirming setting of the alarm clock. For example, the user can be prompted to confirm that the adjusted time information is to be set. A prompt can be displayed to the user that prompts to the user to select whether the setting of the time information is confirmed or denied. In response to receiving confirmation, the setting of the alarm clock according to the adjusted time is completed. The alarm clock operated by the alarm clock app can be associated with the adjusted time. For example, the alarm clock operated by the alarm clock app can obtain (e.g., retrieve) information relating to the adjusted time. The adjusted time can be stored in a table or the like that stores a mapping of time information to a clock.

In some embodiments, after setting of the alarm clock time is completed (e.g., after adjusting of the time information according to the input), the user can trigger the execution by executing a preset touch-control operation. In some embodiments, if no touch-control operation directed at the time-display area is received within a preset amount of time, then the time information displayed in the time-display area is acquired, and the alarm clock is set according to the time information. For example, if no input is received to the time-display area within the preset amount of time after the time information is adjusted, then the alarm clock is set using adjusted time information. The preset amount of time can correspond to a threshold amount of time after receiving the input to adjust the time in the time-display area.

For example, if, after the adjusting of the time information according to the input to the time-display area, no further touch-control operation directed at the time-display area is received within three seconds of receiving the last input associated with the adjusting of the time information, the user can be regarded as having completed the setting operation of the alarm clock time. Therefore, the time information displayed in the time-display area can be obtained, and the alarm clock can be set using the time information displayed in the time-display area. In the above example, the preset time segment is three seconds. In other implementations, different time segment lengths can be set according to specific needs. In some embodiments, the preset amount of time can be configurable according to user preferences, device settings, or the like.

By using the simple operating method provided by various embodiments in order to set an alarm, the user might be responding to a temporary need arising from some sudden circumstances and not to a long-term need. In view of the above, the alarm set can be a temporary alarm that provides only one alert (also referred to as a single alarm). In other words, after a single alert is provided as a ringing sound or in some other form when a preset time point is reached, the alarm will be deleted. According to various embodiments, a single alarm can be set using process 100 and a persistent alarm can be set according to conventional processes for setting an alarm (e.g., setting the alarm directly in the alarm clock app or in device settings).

In some embodiments, alarm setting, deleting, and other such functions can be implemented according to an interface provided by the system platform. For example, on a smart device that uses an Android® system, the method provided by the "alarmManager" class can be used to implement the function described above. In some embodiments, inputs to an interface including the time-display area (e.g., when the device is in a screen-locked state) can be used to set an alarm, to delete an alarm, or to perform other functions relating to an alarm clock.

In some embodiments, after an alarm-setting operation is completed (e.g., after the alarm clock is set according to the adjusted time), the reminder information is displayed on the display screen and/or an appropriate alarm listing in the alarm clock app is added.

Because various embodiments provide a convenient and fast approach to setting an alarm, the user does not need to enter or interface with a conventional alarm-setting interface. For example, a user can directly complete the alarm-setting operation on the lock screen interface or the desktop. In view of the change in operating mode, and in order to clearly notify the user that the alarm setting has been completed, following completion of the setting of the alarm, reminder information indicating that the alarm clock has been set can be provided in a preset position on the display screen. The reminder information indicating that the alarm clock has been set can include an alarm clock icon and/or time information corresponding to the alarm clock.

Figure 4:
FIG. 4 is an illustration of alarm clock reminder information displayed in a preset position according to various embodiments of the present disclosure.

FIG. 4 is an illustration of alarm clock reminder information displayed in a preset position according to various embodiments of the present disclosure.

Referring to FIG. 4, a display screen 400 including alarm clock reminder information is provided. Display screen 400 can be provided in connection with process 100 of FIG. 1. For example, in response to the alarm being set, display screen 400 can be displayed. Display screen 400 can be provided by alarm clock setting unit 500 of FIG. 5, device 600 of FIG. 6, or computer system 700 of FIG. 7.

Display screen 400 includes an alarm clock reminder area 410. The alarm clock reminder area 410 includes alarm clock reminder information. For example, the alarm clock reminder area 410 can be populated with alarm clock reminder information to provide an indication that the alarm clock is set and/or time information associated with the alarm clock. As illustrated in FIG. 4, alarm clock reminder area 410 can include an alarm clock icon displayed in the lower part of the time-display area, and specific time information corresponding to the alarm (e.g., "13:30").

According to various embodiments, because the user might need to cancel the alarm because of an incorrectly performed setting or for some other reason, an alarm listing corresponding to the alarm can be generated in the alarm clock app (e.g., an alarm clock app that is installed on the smartphone) after the alarm setting is completed in order to facilitate alarm cancellation by the user. The alarm clock app in which the alarm listing is updated to include the alarm set according to various embodiments can be a default alarm clock app that is configured by the device. In some embodiments, the alarm clock app in which the alarm listing is updated to include the alarm set according to various embodiments is the alarm clock app which is installed by a device manufacturer and that is standard with the device. In some embodiments, the user can select the specific alarm clock app in which the alarm listing is updated to include the alarm that is set by, for example, process 100. Accordingly, when the user wishes to cancel the alarm, the user can simply enter the alarm clock app and delete the corresponding alarm listing. During specific implementation, one can generate said alarm listing by employing a background operating approach. In some embodiments, an operation to update the alarm listing to include the alarm, or to generate the alarm listing, can be invoked and executed in the background.

In some embodiments, after the alarm is set according to the adjusted time information, the display mode according to which a real-time display of the time is displayed can be restored. In response to the alarm being set, the display of the time-display area can be restored to display real-time information. The time-display area can be restored in response to an input (e.g., by the user) or automatically in response to the alarm being set.

In some embodiments, the time-display area on the display screen undergoes dynamic display updating of the current system time in real time. In the event that the alarm is set through touch-control operations directed at the time-display area, the time-display area pauses the real-time display mode, and displays within the time-display area the time following the adjustment based on the touch-control operations. Thus, after the alarm setting is complete, the display mode of the time-display area can be restored to real-time display mode. For example, the system time is dynamically displayed in real time in the time-display area.

For example, at the time corresponding to 13:25, the user sets an alarm having the alert time corresponding to 13:30. After setting of the alarm is complete, the time of the display area on the display screen is 13:30. At this point (e.g., upon completion of the setting of the alarm), the system time that is obtained through the background (e.g., a background process being executed by, for example, the operating system of the device) is 13:26. Thus, the time of the time-display area in the display screen is adjusted to 13:26, and dynamic updating of the display continues in the time-display area (e.g., the display in the time-display area is restored to a real-time display).

Thus far we have described the specific processing process for implementing the technical scheme on a touchscreen device that displays time digitally. In an actual application, this technical scheme can also be applied to a touchscreen device that displays time using a dial clock. A further explanation is provided below for such an implementation.

In some embodiments, an alarm can be set according to an input to a device that displays time using a dial clock. In the event that the device includes an interface displaying time via a dial clock, then the input (e.g., the touch-control operation) received at 110 can correspond to an input (e.g., a touch-control operation) directed at the hour hand display or the minute hand display of the dial clock displayed in the time-display area. An input such as a touch-control operation can be deemed to be directed at the hour hand or the minute hand if the input overlaps with the corresponding hour hand or minute hand, or if the input is within a predefined threshold distance of the corresponding hour hand or minute hand. The received input can include: a rotating swipe in a clockwise direction or a rotating swipe in a counterclockwise direction.

At 120, the time information is adjusted according to the input to the time-display area. For example, the display positions of the one or more of the hour hand and minute hand on the dial clock are updated according to the touch-control operation. The hour hand and/or the minute hand of the dial clock can be adjusted to the corresponding expected time positions of the alarm setting corresponding to the input by the user.

In some embodiments, in order to make the time on the dial clock display more accurately, in response to receiving a touch-control operation directed at the minute hand, appropriate position adjustments are made to the hour hand by calculating the deflection angle of the minute hand. For example, in the event that the hour hand and the minute hand are both pointed at the dial number "12," and the position of the minute hand is adjusted according to the received touch-control operation so that the minute hand points to the position of the dial number "3," a deflection angle for the minute hand can be computed and the hour hand can be adjusted to correspond to the computed deflection angle according to the adjusted position (e.g., time) of the minute hand. Using the above example, the deflection angle of the minute hand is 90°. In response to computing the deflection angle of the minute hand, an angle for positioning of the hour hand can be computed based at least in part on the deflection angle of the minute hand. The positioning of the hour hand can be adjusted based on the computed deflection angle of the minute hand (e.g., using the computed angle for positioning of the hour hand). Accordingly, the hour hand can be adjusted by rotating the hour hand clockwise to the 7.5° position relative to the dial number "12." In some embodiments, in response to receiving a touch-control operation directed at the hour hand, the display position of the hour hand and minute hand can be adjusted in the same manner as described above in relation to computing the deflection angle of the hand subject to the touch-control operation and also adjusting the other hand.

At 130, in connection with setting the alarm clock, deflection angles of the hands in a preset coordinate system are obtained (e.g., according to the current positions of the hour hand and the minute hand in the dial clock displayed in the time-display area). For example, the deflection angles of the hands in the preset coordinate system can be computed based at least in part on the adjusted positioning (e.g., that can correspond to the adjusted time information) of the hour hand and minute hand. The preset coordinate system can correspond to an x-y axis system (e.g., a Cartesian coordinate system) according to which the horizontal, right-oriented direction is the positive direction on the x-axis and the vertical, upward direction is the positive direction on the y-axis. In some embodiments, the specific time value displayed on the dial clock is determined according to the deflection angles. The alarm is set according to the time value. In some embodiments, the deflection angles of the hands can be computed based at least in part on the time information corresponding to the time-display area. For example, the deflection angles can be computed based at least in part on the current positions of the hour hand and the minute hand of the dial clock displayed in the time-display area. In some embodiments, the obtaining of the deflection angles can include obtaining time information corresponding to the dial clock displayed in the time-display area. For example, the time information corresponding to the dial clock displayed in the time-display area can include deflection angles computed in connection with the adjusting of the time information.

In some embodiments, the input corresponds to a touch input to a touchscreen on a device such as a smart device. However, according to various embodiments, the input is received via an external input device such as a mouse, trackball, or by a sound such as a voice command. For example, the device implementing various embodiments may not have a touchscreen and the input can be received via a means other than a touch input to a touchscreen. For example, the touch-control operations described above can refer to clicks, drags, and other such control operations directed at the time-display area on the display screen using an external input device such as a mouse.

In some embodiments, a click or drag operation is received through a mouse directed at a time numeral in the time-display area. In some embodiments, a drag operation can be received from an input by a mouse directed at an hour hand or a minute hand of a dial clock in the time-display area. The time information in the time-display area is adjusted according to the received above-described operations, and the alarm is set according to the adjusted time information.

Because some embodiments are implemented on devices having a touchscreen and some embodiments are implemented on devices not having a touchscreen, the main difference between such embodiments is the difference in the specific forms of inputs (e.g., touch-control operations). For example, a device with a touchscreen device can receive an input in the form of a click operation or swiping operation of a finger. In contrast, a device without a touchscreen can receive an input in the form of a click operation or drag operation from a mouse. According to various embodiments, processing of the input such as adjusting the time and setting the alarm according to the input (e.g., the touch-control operation) is similar.

Various embodiments include an alarm clock setting unit for a device (e.g., a smart device) that can implement the alarm clock setting method for a device (e.g., a smart device). The alarm clock setting unit can visualize touch-point tracks of a touchscreen device.

Figure 5:
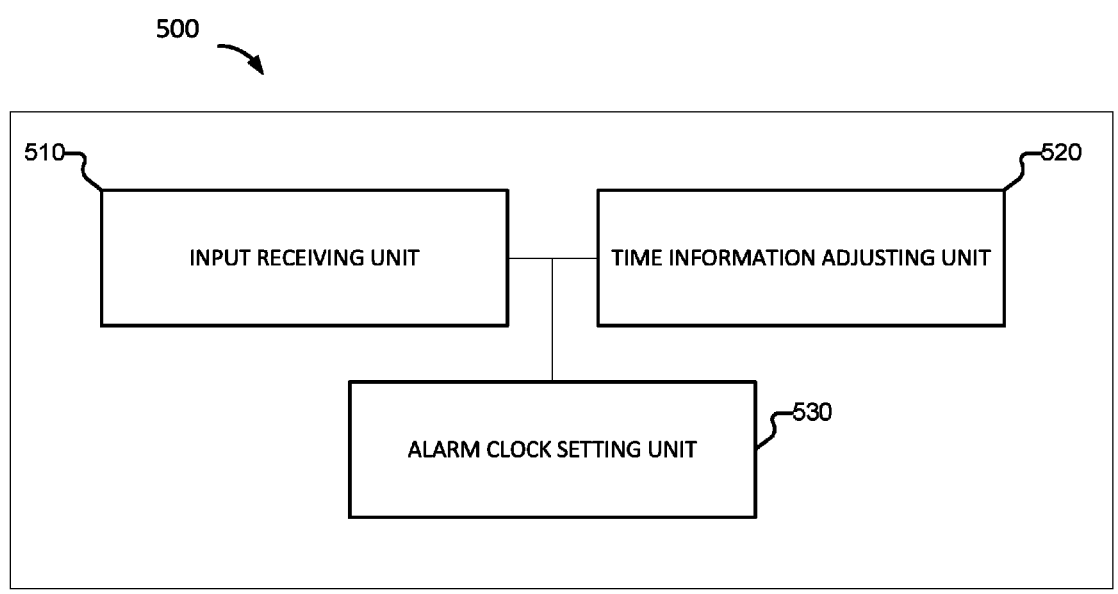
FIG. 5 is a diagram of an alarm clock setting unit for a smart device according to various embodiments of the present disclosure.

FIG. 5 is a diagram of an alarm clock setting unit for a smart device according to various embodiments of the present disclosure.

Referring to FIG. 5, alarm clock setting unit 500 is provided. Alarm clock setting unit 500 can set an alarm clock of a device based at least in part on one or more inputs to the device. Alarm clock setting unit 500 can implement process 100 of FIG. 1 and/or process 300 of FIG. 3. Alarm clock setting unit 500 can be implemented in device 600 of FIG. 6 and/or computer system 700 of FIG. 7.

The alarm clock setting unit 500 comprises an input receiving unit (e.g., a touch-control operation receiving unit) 510, a time information adjusting unit 520, and an alarm setting unit 530. The touch-control input receiving unit 510 is configured to receive an input to a time-display area on a display. For example, the input receiving unit 510 can be configured to receive touch-control operations directed at the time-display area on the display screen. The time information adjusting unit 520 is configured to adjust the time information displayed on the display screen according to the input to the time-display area. For example, time information adjusting unit 520 is configured to adjust the time information displayed on said display screen according to the touch-control operations to the time-display area on the display screen. The alarm setting unit 530 is configured to set the alarm according to the adjusted time information.

In some embodiments, the input receiving unit 510 is configured to receive a touch-control operation directed at a time-display area on a lock screen interface, to receive a touch-control operation directed at a time-display area on a desktop, or to receive a touch-control operation directed at a time-display area on a status bar displayed on a screen of the device.

In some embodiments, alarm clock setting unit 500 comprises an alarm clock setting interface display unit that is configured to display an alarm clock setting interface in response to the input receiving unit 510 receiving an input such as a touch-control operation. The time information adjusting unit 520 can be configured to adjust information in the alarm clock setting interface based on the input such as the touch-control operation.

In some embodiments, the time information adjusting unit 520 is configured to adjust time information in the time-display area based on the input (e.g., the touch-control operation).

If the device is a device, such as a smart device, that has a touchscreen, the input receiving unit 510 can be configured to receive time numeral touch-control operations directed at time numerals in the time-display area, the time numerals comprising clock numerals or minute numerals, or receiving hour hand or minute hand touch-control operations directed at a dial clock in the time-display area.

In some embodiments, the input receiving unit 510 (e.g., the touch-control operation receiving unit) can be configured to receive a touch-control operation directed at a time numeral in the time-display area, and the time information adjusting unit 520 can comprise a time numeral increasing unit that is configured to increase the time numeral displayed in the time-display area in accordance with the value range of the time numeral in the event that the touch-control operation is an upward swipe, and a time numeral decreasing unit that is configured to decrease the time numeral displayed in the time-display area in accordance with the value range of the time numeral in the event that the touch-control operation is a downward swipe.

In some embodiments, the input receiving unit 510 comprises an initial operation receiving sub-unit, a time-selection control displaying sub-unit, and a time numeral selecting sub-unit. The input receiving unit 510 (e.g., the touch-control operation receiving unit) can be configured to receive a touch-control operation directed at a time numeral in the time-display area.

In some embodiments, the initial operation receiving sub-unit is configured to receive an initial touch-control operation directed at the time numeral.

In some embodiments, the time-selection control displaying sub-unit is configured to display an appropriate time-selection control in the display area corresponding to the time numeral.

In some embodiments, the time numeral selecting sub-unit is configured to receive a selection operation for the time numeral displayed by the time-selection control.

In some embodiments, the input receiving unit 510 is configured to receive time numeral click or drag operations directed at time numerals in the time-display area through an external input device, or to receive hour hand or minute hand drag operations directed at a dial clock in the time-display area through an external input device. For example, if the device is a device such as a smart device that does not have a touchscreen, a touch receiving unit can receive time numeral click or drag operations directed at time numerals in the time-display area through an external input device, or receive hour hand or minute hand drag operations directed at a dial clock in the time-display area through an external input device.

In some embodiments, alarm clock setting unit 500 comprises a display-enlargement unit configured to enlarge time-display area in accordance with preset dimensions in response to the input receiving unit 510 receiving a touch-control operation.

In some embodiments, the time information adjusting unit 520 is configured to adjust time information in the time-display area after enlargement by the display-enlargement unit according to the touch-control operation.

In some embodiments, the alarm setting unit 530 comprises: a time assessing sub-unit, a time information acquiring sub-unit, and a setting execution sub-unit.

The time assessing sub-unit can be configured to determine whether a touch-control operation directed at the time-display area is received within a preset time segment.

The time information acquiring sub-unit can be configured to acquire the time information displayed in the time-display area when the output result of the time assessing sub-unit is negative.

The setting execution sub-unit can be configured to set the alarm clock according to the acquired time information.

In some embodiments, the alarm setting unit 530 is configured to set a temporary alarm clock that provides only one alert (e.g., is a single alarm) according to adjusted time information.

In some embodiments, alarm clock setting unit 500 comprises a reminder information displaying unit. The reminder information displaying unit is configured to display reminder information indicating that said alarm clock has been set. The reminder information displaying unit can display the reminder information in a preset position on the display screen in response to completion of the setting of the alarm clock.

In some embodiments, the reminder information displaying unit is configured to display an alarm clock icon and/or time information corresponding to the alarm clock in a preset position on the display screen.

In some embodiments, alarm clock setting unit 500 comprises a display-mode restoring unit. The display-mode restoring unit is configured to restore the display mode of the time-display area to a real-time display mode in response to the alarm clock setting unit completing setting the alarm clock.

In some embodiments, alarm clock setting unit 500 comprises an alarm clock listing generating unit. The alarm clock listing generating unit is configured to generate an alarm clock listing that corresponds to the adjusted time information in an alarm clock app on the smart device in response to the alarm clock setting unit completing the setting of the alarm clock.

Figure 6:
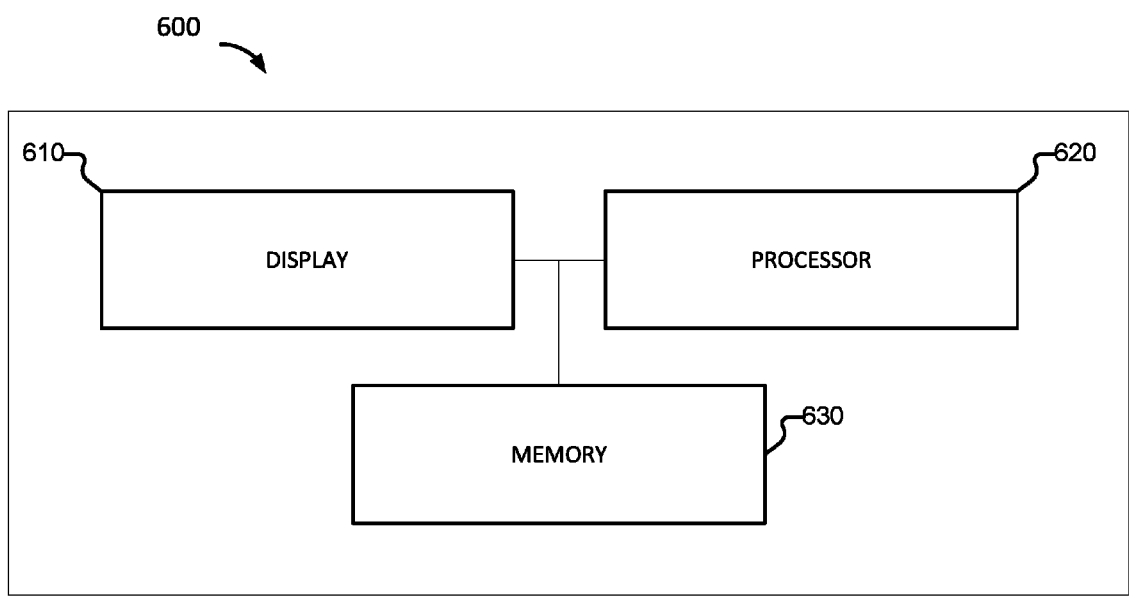
FIG. 6 is a diagram of an electronic device according to various embodiments of the present disclosure.

FIG. 6 is a diagram of an electronic device according to various embodiments of the present disclosure.

Referring to FIG. 6, electronic device 600 is provided. Electronic device 600 can receive an input in connection with setting an alarm, adjust time based at least in part on the alarm, and set the alarm according to the adjusted time. Electronic device 600 can implement process 100 of FIG. 1 and/or process 300 of FIG. 3. Electronic device 600 can include alarm clock setting unit 500 of FIG. 5.

Electronic device 600 comprises a display 610, a processor 620, and memory 630.

In some embodiments, memory 630 is configured to store one or more alarm clock setting programs. In the event that an alarm clock setting program is accessed and executed by processor 620, the following operations are executed: receiving an input such as a touch-control operation directed at a time-display area on a display screen, adjusting the time information displayed on the display screen according to the input (e.g., the touch-control operation), and setting the alarm clock according to the adjusted time information.

In one typical configuration, the electronic device 600 comprises one or more processors (CPUs), input/output interfaces, network interfaces, and memory.

Memory can include such forms as volatile storage devices in computer-readable media, random access memory (RAM), and/or non-volatile memory, such as read-only memory (ROM) or flash memory (flash RAM). A storage device is an example of a computer-readable medium.

Computer readable media include permanent, non-permanent, mobile, and non-mobile media that can be used to store information by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media (transitory media), such as modulated data signals and carrier waves.

A person skilled in the art should understand that the embodiments of the present application can be provided as methods, systems, or computer program products. Therefore, the present application can take the form of completely hardware embodiments, completely software embodiments, or embodiments that combine software and hardware. Moreover, the present application can take the form of computer program products implemented on one or more computer-operable storage media (including but not limited to magnetic disk storage, CD-ROMs, and optical storage) containing computer-operable program code.

Figure 7:
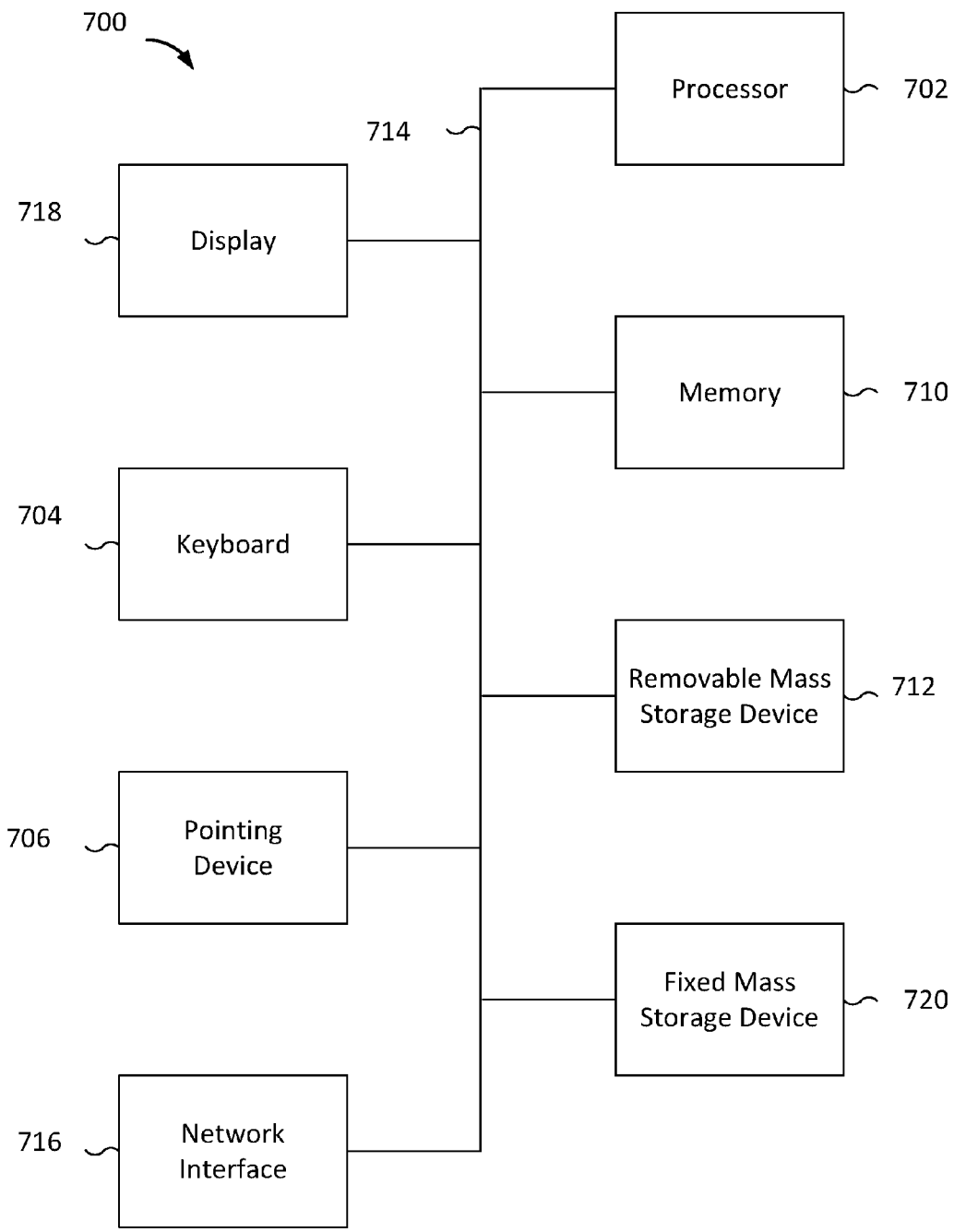
FIG. 7 is a functional diagram of a computer system for implementing an alarm clock function according to various embodiments of the present disclosure.

FIG. 7 is a functional diagram of a computer system for implementing an alarm clock function according to various embodiments of the present disclosure.

Referring to FIG. 7, a computer system 700 for implementing an alarm clock is displayed. Computer system 700 can implement process 100 of FIG. 1, process 300 of FIG. 3, alarm clock setting unit 500 of FIG. 5, and electronic device 600 of FIG. 6.

Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or unidirectional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The aforesaid integrated units can take the form of hardware, or they can take the form of hardware combined with software function units.

The units described above in which the software function units are integrated can be stored in a computer-readable storage medium. The software function units described above are stored in a storage medium and include a number of commands whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

Although the present application is disclosed using the preferred embodiments above, they cannot be used to limit the present application. Any person with skill in the art can make possible alterations and modifications without departing from the spirit and scope of the present application. Therefore, the scope of protection of the present application shall be the scope defined by the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving an input directed at a time-display area on a display screen of a device, wherein the device is in a locked state;
    adjusting time information displayed on the display screen according to the input; and
    setting an alarm clock according to the adjusted time information.

2. The method of claim 1, wherein the input corresponds to a touch-control operation to a touchscreen.

3. The method of claim 1, further comprising:
    in response to receiving the input, displaying an alarm clock setting interface, wherein time information displayed on the display screen comprises time information in the alarm clock setting interface.

4. The method of claim 1, wherein the time information displayed on the display screen comprises time information in the time-display area.

5. The method of claim 1, wherein the time information displayed on the display screen comprises time information in the time-display area, and the device is a smart device that has a touchscreen.

6. The method of claim 1, wherein the device comprises a touchscreen, the input corresponds to a touch-control operation to a touchscreen, and the touch-control operation comprises:
a time numeral touch-control operation directed at the time-display area, a time numeral in the time-display area comprising an hour numeral or a minute numeral; or
a time touch-control operation directed at an hour hand or a minute hand of a dial clock displayed in the time-display area.

7. The method for setting the alarm clock on a smart device as described in claim 6, wherein the device comprises a touchscreen, the input corresponds to a touch-control operation to the touchscreen, and the touch-control operation comprises: a time numeral touch-control operation directed at the time-display area, a time numeral in the time-display area comprising an hour numeral or a minute numeral; or a touch-control operation directed at an hour hand or a minute hand of a dial clock displayed in the time-display area; and
in the event that the touch-control operation is a time numeral touch-control operation directed at the time-display area, the adjusting of the time information in the time-display area according to the input comprises:
in the event that the touch-control operation is an upward swipe, increasing at least one of time numerals displayed in the time-display area in accordance with a value range of the corresponding at least one of the time numerals; and
in the event that the touch-control operation is a downward swipe, decreasing at least one of the time numerals displayed in the time-display area in accordance with the value range of the corresponding at least one of the time numerals.

8. The method of claim 1, wherein the device comprises a touchscreen, the input corresponds to a touch-control operation to the touchscreen, and the touch-control operation comprises: a time numeral touch-control operation directed at the time-display area, a time numeral in the time-display area comprising an hour numeral or a minute numeral; or a touch-control operation directed at an hour hand or a minute hand of a dial clock displayed in the time-display area, and
wherein in the event that the touch-control operation is a time numeral touch-control operation directed at the time-display area, the receiving of the input directed at the time-display area on the display screen comprises:
receiving an initial touch-control operation directed at time numerals;
displaying a time-selection control in the time-display area corresponding to the time numerals; and
receiving a selection operation for a time numeral displayed by the time-selection control.

9. The method of claim 8, wherein the time-selection control is a wheel control.

10. The method of claim 1, wherein the input comprises:
a click or drag operation input by an external input device, the click or drag operation being directed at a time numeral within the time-display area; or
a drag operation input by an external input device, the drag operation being directed at an hour hand or a minute hand of a dial clock displayed in the time-display area.

11. The method of claim 1, further comprising:
in response to receiving of the input directed at the time-display area on the display screen, enlarging the time-display area in accordance with preset dimensions.

12. The method of claim 1, wherein the setting of the alarm clock according to the adjusted time information comprises:
determining that no touch-control operation directed at the time-display area is received within a preset time segment; and
in response to determining that no touch-control operation directed at the time-display area is received within the preset time segment:
obtaining the time information displayed in the time-display area; and
setting the alarm clock according to the obtained time information.

13. The method of claim 1, wherein the alarm clock set according to the adjusted time information is a temporary alarm clock that provides only one alert.

14. The method of claim 1, further comprising:
in the event that the alarm clock is set according to the adjusted time information, displaying, in a preset position on the display screen, reminder information indicating that the alarm clock has been set.

15. The method of claim 1, further comprising:
in the event that the alarm clock is set according to the adjusted time information, displaying, in a preset position on the display screen, reminder information indicating that the alarm clock has been set, the reminder information comprising one or more of an alarm clock icon and time information corresponding to the alarm clock.

16. The method of claim 1, further comprising:
in the event that the alarm clock is set according to the adjusted time information, restoring a display mode of the time-display area to a real-time display mode.

17. The method of claim 1, further comprising:
in the event that the alarm clock is set according to the adjusted time information, generating in an alarm clock app of the device an alarm clock listing that corresponds to the adjusted time information.

18. A computer program product, the computer program product being embodied in a non-transitory computer readable storage medium and comprising computer instructions for:
receiving an input directed at a time-display area on a display screen of a device, wherein the device is in a locked state;
adjusting time information displayed on the display screen according to the input; and
setting an alarm clock according to the adjusted time information.

19. The computer program product of claim 18, wherein the input corresponds to a touch-control operation to a touchscreen.

20. The computer program product of claim 18, wherein the time-display area is displayed on one or more of a lock screen interface, a desktop, or a status bar.

21. The computer program product of claim 18, further comprising instructions for:
in response to receiving the input, displaying an alarm clock setting interface,
wherein time information displayed on the display screen comprises time information in the alarm clock setting interface.

22. The computer program product of claim 18, wherein the time information displayed on the display screen comprises time information in the time-display area.

23. The computer program product of claim 18, wherein the device is a smart device that has a touchscreen.

24. The computer program product of claim 18, wherein the device comprises a touchscreen, the input corresponds to a touch-control operation to a touchscreen, and the touch-control operation comprises:
a time numeral touch-control operation directed at the time-display area, a time numeral in the time-display area comprising an hour numeral or a minute numeral; or
a time touch-control operation directed at an hour hand or a minute hand of a dial clock displayed in the time-display area.

25. The computer program product of claim 24, wherein in the event that the touch-control operation is a time numeral touch-control operation directed at the time-display area, the adjusting of the time information in the time-display area according to the input comprises:
in the event that the touch-control operation is an upward swipe, increasing at least one of time numerals displayed in the time-display area in accordance with a value range of the corresponding at least one of the time numerals; and
in the event that the touch-control operation is a downward swipe, decreasing at least one of the time numerals displayed in the time-display area in accordance with the value range of the corresponding at least one of the time numerals.

26. The computer program product of claim 24, wherein in the event that the touch-control operation is a time numeral touch-control operation directed at the time-display area, the receiving of the input directed at the time-display area on the display screen comprises:
receiving an initial touch-control operation directed at the time numerals;
displaying a time-selection control in the time-display area corresponding to the time numerals; and
receiving a selection operation for a time numeral displayed by the time-selection control.

27. The computer program product of claim 26, wherein the time-selection control is a wheel control.

28. The computer program product of claim 18, wherein the input comprises:
a click or drag operation input by an external input device, the click or drag operation being directed at a time numeral within the time-display area; or
a drag operation input by an external input device, the drag operation being directed at an hour hand or a minute hand of a dial clock displayed in the time-display area.

29. The computer program product of claim 18, further comprising instructions for:
in response to receiving of the input directed at the time-display area on the display screen, enlarging the time-display area in accordance with preset dimensions.

30. The computer program product of claim 18, wherein the setting of the alarm clock according to the adjusted time information comprises:
determining that no touch-control operation directed at the time-display area is received within a preset time segment; and
in response to determining that no touch-control operation directed at the time-display area is received within the preset time segment:
obtaining the time information displayed in the time-display area; and
setting the alarm clock according to the obtained time information.

31. The computer program product of claim 18, wherein the alarm clock set according to the adjusted time information is a temporary alarm clock that provides only one alert.

32. The computer program product of claim 18, further comprising instructions for:
in the event that the alarm clock is set according to the adjusted time information, displaying, in a preset position on the display screen, reminder information indicating that the alarm clock has been set.

33. The computer program product of claim 18, further comprising instructions for:
in the event that the alarm clock is set according to the adjusted time information, displaying, in a preset position on the display screen, reminder information indicating that the alarm clock has been set, the reminder information comprising one or more of an alarm clock icon and time information corresponding to the alarm clock.

34. The computer program product of claim 18, further comprising instructions for:
in the event that the alarm clock is set according to the adjusted time information, restoring the display mode of the time-display area to a real-time display mode.

35. The computer program product of claim 18, further comprising instructions for:
in the event that the alarm clock is set according to the adjusted time information, generating in an alarm clock app of the device an alarm clock listing that corresponds to the adjusted time information.

36. An alarm clock setting unit comprising:
an input receiving unit configured to receive an input directed at a time-display area on a display screen of a device, wherein the device is in a locked state;
a time information adjusting unit configured to adjust time information displayed on the display screen according to the input; and
an alarm clock setting unit configured to set an alarm clock according to the adjusted time information.

37. A system for setting an alarm clock, comprising:
at least one processor configured to:
receive an input directed at a time-display area on a display screen of a device, wherein the device is in a locked state;
adjust time information displayed on the display screen according to the input; and
set the alarm clock according to the adjusted time information; and
a memory coupled to the at least one processor and configured to provide the at least one processor with instructions.

* * * * *